US006564661B2

(12) United States Patent
DeJonge

(10) Patent No.: US 6,564,661 B2
(45) Date of Patent: May 20, 2003

(54) STORABLE SHIFTER WITH ELECTRONIC GEAR SHIFT RESET

(75) Inventor: Robert A. DeJonge, West Olive, MI (US)

(73) Assignee: Grand Haven Stamped Products, division of JSJ Corporation, Grand Haven, MI (US)

( * ) Notice: Subject to any disclaimer, the term of this patent is extended or adjusted under 35 U.S.C. 154(b) by 6 days.

(21) Appl. No.: 09/775,201

(22) Filed: Feb. 1, 2001

(65) Prior Publication Data

US 2003/0029261 A1 Feb. 13, 2003

(51) Int. Cl.[7] .......................... F16H 59/00; F16H 61/00; F16H 63/00
(52) U.S. Cl. ....................... 74/335; 74/473.21; 74/473.3
(58) Field of Search ............................... 74/335, 473.5, 74/473.12, 473.21, 336 R; 477/97; 701/62, 63, 64, 66

(56) References Cited

U.S. PATENT DOCUMENTS

| | | | |
|---|---|---|---|
| 3,326,315 A | * 6/1967 | Richards | 74/473.3 |
| 3,766,793 A | * 10/1973 | Knop | 74/335 |
| 3,824,948 A | * 7/1974 | Faloon | 116/124 R |
| 4,817,471 A | 4/1989 | Tury | 74/866 |
| 4,826,190 A | * 5/1989 | Hartmann | 280/236 |
| 4,843,901 A | 7/1989 | Peterson et al. | 74/335 |
| 4,884,057 A | * 11/1989 | Leorat | 340/456 |
| 5,156,243 A | 10/1992 | Aoki et al. | 192/4 A |
| 5,161,422 A | 11/1992 | Suman et al. | 74/335 |
| 5,572,907 A | * 11/1996 | Kaakinen | 74/489 |
| 5,884,528 A | 3/1999 | Ludanek et al. | 74/473.3 |
| 6,067,871 A | * 5/2000 | Markyvech et al. | 74/335 |
| 6,145,398 A | * 11/2000 | Bansbach et al. | 74/335 |
| 6,173,622 B1 | * 1/2001 | Carnevale et al. | 74/335 |
| 6,253,869 B1 | * 7/2001 | Wilson et al. | 180/236 |
| 6,295,887 B1 | * 10/2001 | DeJonge et al. | 74/473.3 |

* cited by examiner

Primary Examiner—Sherry Estremsky
Assistant Examiner—Tisha D. Lewis
(74) Attorney, Agent, or Firm—Price, Heneveld, Cooper, DeWitt & Litton

(57) ABSTRACT

A shifter apparatus includes a driver interface module (DIM) movable to request a transmission shift, and a display with indicia for showing the presently selected gear position and for showing a newly selected gear position. A controller is operably coupled to the driver interface module, the display, and sensors for sensing predetermined vehicle conditions. The controller shifts the transmission and changes the display if the vehicle sensors indicate that the predetermined vehicle conditions are met, but doesn't shift the transmission if the predetermined vehicle conditions are not met and further it resets the display to the first indicia. By this arrangement, the shifter senses and shifts based on relative position of the DIM and not absolute position. The shifter is storable and covers can be used to hide it when in the storage position.

44 Claims, 9 Drawing Sheets

STORABLE SHIFTER WITH ELECTRONIC GEAR SHIFT RESET

BACKGROUND OF THE INVENTION

The present invention relates to shifter apparatus for transmissions of passenger vehicles, and more particularly relates to an electronic shifter apparatus that is storable, coverable, and dialable, and further that is programmed to deal with selection of a gear shift change that cannot be effected due to vehicle conditions.

Modern vehicles often include electronic shifters with shift-lever-position sensors that communicate electrically with a vehicle transmission controller. Historically, the shift-lever-position sensors indicate the absolute position of a shift lever as a way of communicating a selected gear position, and the controller controls shifting of the vehicle's transmission based on these inputs. The vehicle controller is typically connected to other vehicle sensors and programmed to not allow a driver to make unsafe shifts. For example, the controller will prevent a shift from a drive gear position into a reverse gear position when the vehicle is going too fast, such as when the vehicle is moving at a speed above 5 miles per hour. However, if the shift lever remains in the "requested" shift position, the controller will suddenly and unexpectedly cause a shift at a time when the vehicle conditions satisfy the parameters established to allow a gear change. This can result in a very hard shift that is rough on a transmission since it will occur at a maximum allowed speed (e.g. 5 mph). Further, it can be unacceptable and unsafe for drivers since it typically occurs with an unexpected sharp or heavy clunk and at an unexpected time. In some vehicles, a shift such as described above can result in stalling the vehicle engine. In order to prevent this problem in electronic shifters, some manufacturers have added solenoid-operated extendable pins to prevent movement of the shift lever into the "unacceptable" gear position. However, sometimes it is preferable to allow a vehicle driver to request a shift to see what new gear position is being selected, and then determine if the shift should occur. (For example, shifting from drive to neutral is okay, but shifting from drive to reverse is not.) Further, it may be preferable to communicate to the vehicle driver that the requested shift has not occurred, and/or that the requested shift may occur at any time in the future rather than preventing the driver from requesting a shift.

Another issue related to the present invention is theft deterrence. Theft of modern vehicles is a major problem, and it is desirable to provide a system that is capable of both hiding a shifter and also physically securing the shifter in an inaccessible position, particularly when the vehicle is parked.

Another issue is ergonomic considerations in the design and execution of modern shift control systems. Many times a design must necessarily be compromised in order to satisfy the widest range of potential vehicle operators, given the wide variation of physical size. This results in a compromised control layout and/or a certain percentage of operators operating the shift controls in a less than ideal manner. Thus, it is desirable to include a shift control system capable of adjusting and adapting to vehicle operators of various sizes and physical makeups.

Appearance and style are also highly important features in modern vehicles. Many vehicles have a passenger compartment that is purposefully clean and uncluttered in appearance. For such vehicles, it can be very important to cover or shield a shifter from view.

Accordingly, a shifter solving the aforementioned problems and having the aforementioned advantages is desired.

SUMMARY OF THE PRESENT INVENTION

In one aspect of the present invention, a shifter apparatus is provided for shifting a transmission having a plurality of gear positions. The shifter includes a base and a driver interface module attached to the base and movable from a first position to a second position to indicate a desire to shift the transmission from a presently selected one of the gear positions to a new one of the gear positions. A display is provided that is capable of generating indicia corresponding to the plurality of gear positions of the transmission. The indicia includes a first indicia showing the presently selected one gear position and a second indicia corresponding to the new one gear position. At least one sensor is provided that is adapted to sense predetermined vehicle conditions. A controller is operably coupled to the driver interface module, the display and the sensor. The controller is programmed to generate a transmission-controlling output signal adapted to shift the transmission to the new one gear position when the driver interface module indicates a shift change and the at least one sensor indicates the predetermined vehicle conditions are met. The controller is further programmed to change the display from the first indicia to the second indicia under such circumstances. The controller is further programmed to not shift the transmission and to instead cause the display to show the first indicia until a new shift request signal is received from the driver interface module when the driver interface module indicates a shift change but the at least one sensor does not indicate that the predetermined vehicle conditions are met.

In another aspect of the present invention, a shifter apparatus for shifting a transmission includes a base and a driver interface module attached to the base and movable from a first position to a second position to indicate a desire to shift the transmission from a presently selected one of the gear positions to a new one of'the gear positions. A display is provided capable of generating indicia corresponding to the plurality of gear positions of the transmission. The indicia includes a first indicia showing the presently selected one gear position and a second indicia corresponding to the new one gear position. At least one sensor is provided that is adapted to sense predetermined vehicle conditions. A controller is operably coupled to the driver interface module, the display, and the sensor. The controller is programmed to generate a transmission-controlling output signal adapted to shift the transmission to the new one gear position when the driver interface module indicates a shift change and the at least one sensor indicates the predetermined vehicle conditions are met. The controller is further programmed to change the display from the first indicia to the second indicia under such circumstances. The controller is further programmed to not shift the transmission until a new driver-interface signal is received. The controller includes a timer and is programmed to initially change the display to show the second indicia upon receiving an indication for the shift change from the driver interface module, but is programmed to reset the display to show the first indicia if the timer times out before the at least one sensor indicates that the predetermined vehicle conditions are met.

In another aspect of the present invention, an apparatus is provided that is adapted for connection to vehicle sensors and further adapted for connection to a driver interface module, such as a shift lever, for shifting a transmission having a plurality of gear positions, and still further adapted for connection to a display for indicating selected gear positions. The apparatus includes a controller programmed to generate a transmission-controlling output signal adapted to shift the transmission to the new one gear position when a shift-change-request signal is received from the driver interface module and when a vehicle-conditions-met signal is received from the vehicle sensor indicating that the predetermined vehicle conditions are met. The controller is further adapted to generate a display-controlling output signal adapted to change the display from a first indicia to a second indicia under such circumstances. The controller is further programmed to not shift the transmission, and instead to cause the display to show the first indicia until a new shift-change-request signal is received when the shift-change-request signal is received from the driver interface module but the vehicle-conditions-met signal is not received from the sensor.

In another aspect of the present invention, an apparatus is provided for shifting a vehicle transmission having a plurality of gear positions. The apparatus includes a driver interface module configured to move between a plurality of discrete positions and to generate a shift-change-request signal based on the movement. A controller is operably connected to the driver interface module for receiving the shift-change-request signal. The controller is programmed to shift the vehicle transmission based on a relative change in position of the driver interface module as the driver interface module is moved between the discrete positions. The controller is characteristically programmed so that the plurality of discrete positions correspond to the plurality of gear positions at any point in time, but so that the plurality of discrete positions will index and correspond in a new manner to the plurality of gear positions if the shift request signal is rejected by the controller.

In still another aspect of the present invention, a shifter apparatus is provided for shifting a transmission for a vehicle. A base defines a cavity, and a driver interface module configured and adapted to shift a vehicle transmission is movably mounted to the base for linear movement between a use position located at least partially outside the cavity and a stored position in the cavity.

In yet another aspect of the present invention, a shifter apparatus for shifting a transmission for a vehicle includes a base, a driver interface module operably mounted to the base, and a cover movable between an open position for permitting driver access to the driver interface module and a shielding position for covering the driver interface module.

An object of the present invention is to provide a shifter that responds to relative movement and positioning of a driver interface device, such as a dialable handle or knob. An advantage of such a shift system is that it can be programmed to reject a shift and reset itself rather than later performing an unexpected unsafe shift. For example, this can occur when a driver attempts to shift to a low or reverse gear from drive when driving at a high speed.

A further object is to provide a shifter that is adjustable for movement to an optimal location relative to a driver.

Still another object is to provide a shifter with a rotatable driver interface module, such as a dialable knob, having an outer ring and a depressible button within the ring for confirming a selected dialed position. In a narrower aspect, a timer is added to the circuit to require that the button be depressed for confirmation of a dialed position before the timer times out.

These and other features, objects, and advantages of the present invention will become apparent to a person of ordinary skill upon reading the following description and claims together with reference to the accompanying drawings.

DETAILED DESCRIPTION OF PREFERRED EMBODIMENT

Figure 1:
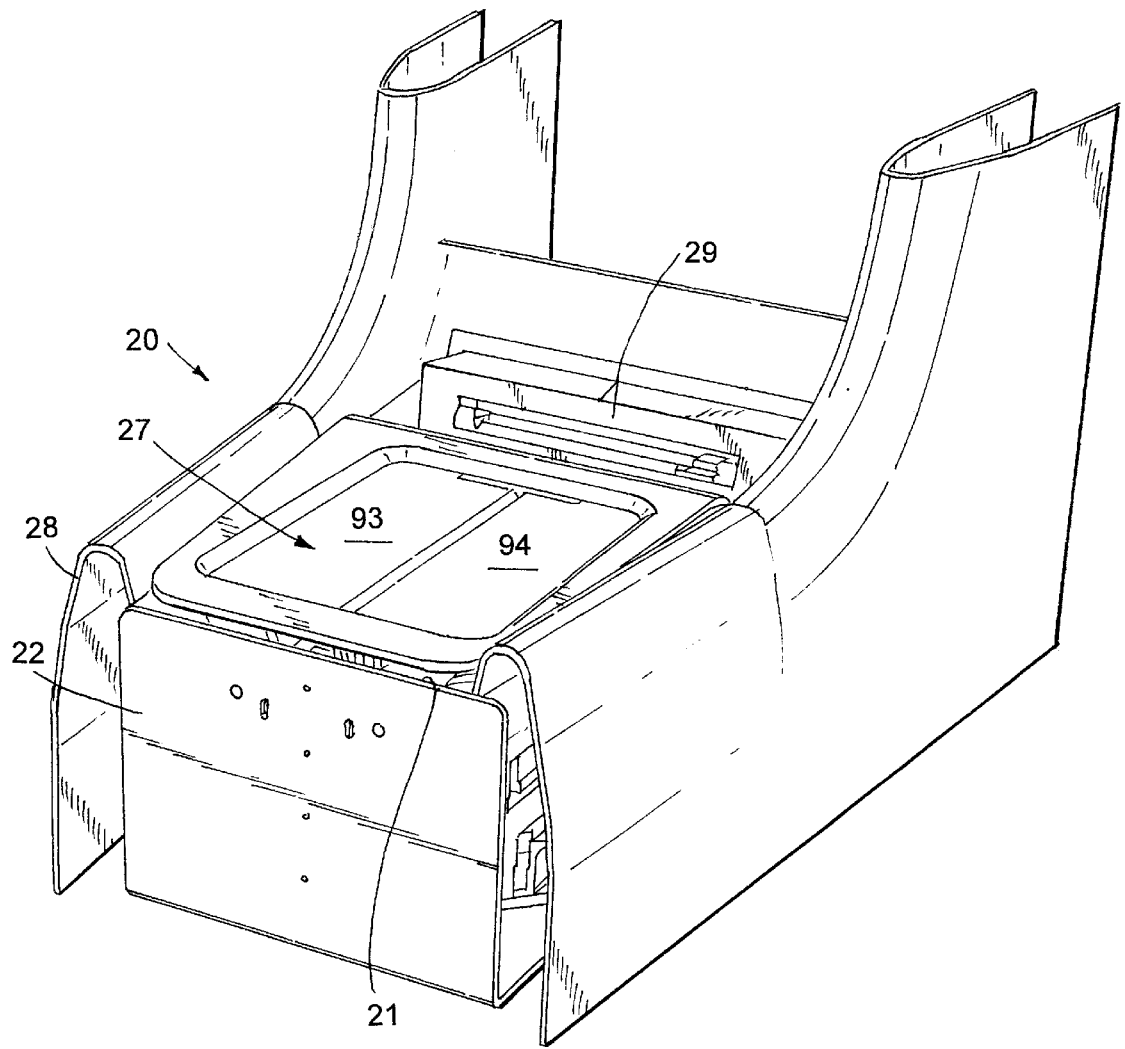
FIG. 1 is a perspective view of a shifter apparatus embodying the present invention, the shifter being in a lowered storage position in a cavity of a vehicle console.
Figure 3:
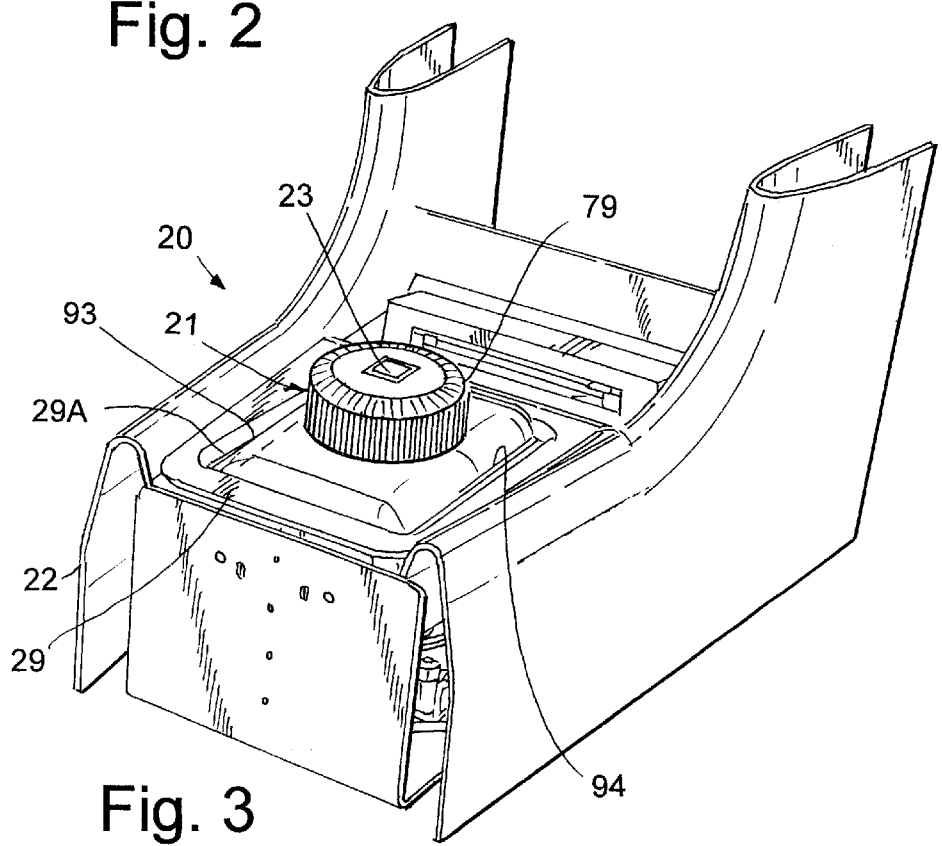
Figure 4:
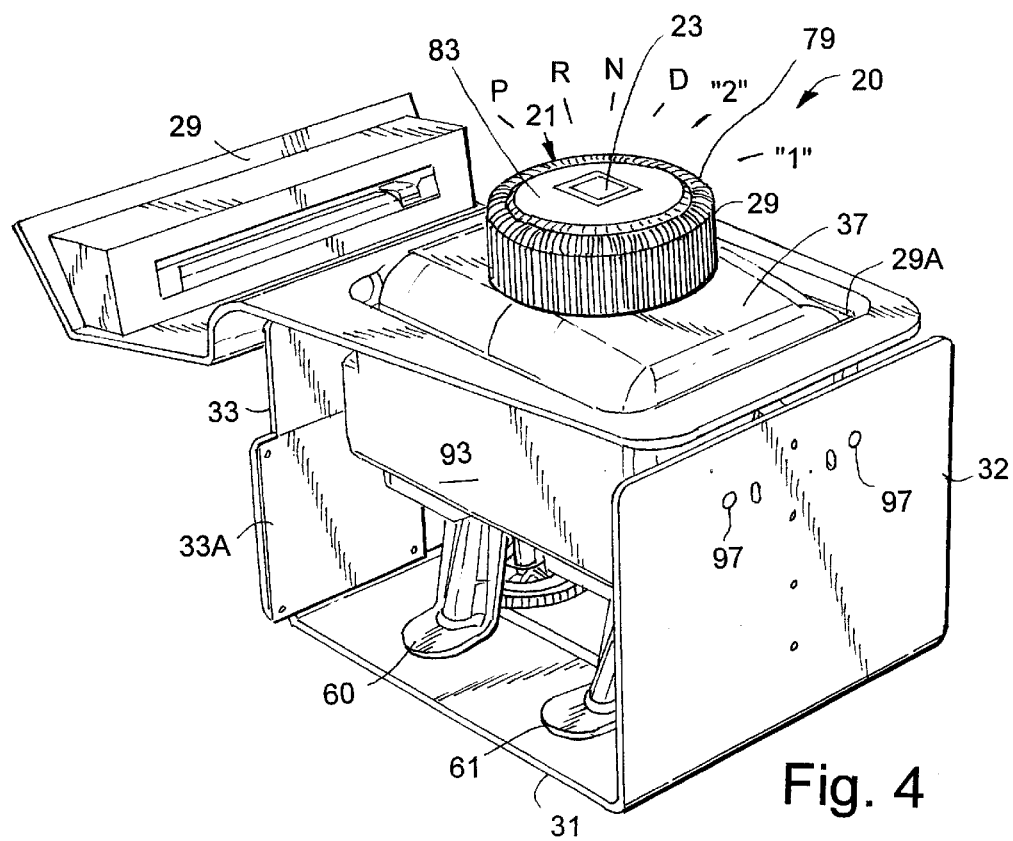
FIG. 4 is a perspective view of the shifter shown in FIG. 1, but with the console removed to show the shifter more clearly.

A shifter 20 (FIG. 1) is provided for shifting a transmission between its different gear positions (such as park, reverse, neutral, drive, and low). The shifter 20 includes a dialable driver interface module 21 (FIG. 3) movably mounted for rotation on a base 22 such as a console 28 between vehicle front seats (FIG. 1). The knob 79 (FIG. 3) of the driver interface module 21 is rotatably supported on the base 22 and is movable to "request" a shift of the transmission. An LED display 23 is positioned inside a ring-shaped rotatable handle 79 of the interface module 21 and is configured to show different indicia in a window 23A with the appropriate indicia (e.g. "P" for park, "R" for reverse, "N" for neutral, "D" for drive, "2" for second gear, or "1" for first gear) for the presently selected gear position being lighted in the window. Sensors 25 (FIG. 8) are provided in the vehicle for sensing predetermined vehicle conditions, such as that a brake pedal is depressed, or for sensing a vehicle speed, or that a key is in the ignition and in an "on" position. A controller 26 (FIG. 8) is operably coupled to the driver interface module 21, the display 23, and the vehicle sensors 25. Upon receipt of a shift change request from the driver interface module 21, the controller 26 refers to a lookup table and is configured to output a shift-change-request output signal that shifts the transmission to the requested gear position and that changes the indicia shown in the window 23A. This presumes that the vehicle sensors 25 indicate that the predetermined vehicle conditions are met and the transmission can be safely shifted to the requested gear position. However, if the shift change requested cannot be safely made (i.e. the predetermined vehicle conditions are not met), the controller 26 doesn't shift the transmission and further, in such circumstance, it resets the display 23 from the second indicia to the first indicia and also re-indexes the shift pattern (PRNDL) so that the new position of the driver interface module (DIM)

corresponds to the actual gear position. In other words, the shifter apparatus 20 including the controller 26 senses relative movement of the dialable knob 79 of the driver interface module 21 for making gear shift changes in the transmission, instead of reacting to the absolute position of the driver interface module 21. By way of example, this advantageously prevents a driver from selecting a park gear position while the vehicle is moving at a high speed. It also prevents the transmission from unexpectedly dropping with a heavy "clunk" into the park gear as the vehicle speed is reduced. It also prevents the unsafe condition of the driver interface module (DIM) and the transmission being out of synchronization, as discussed below. Further, the shifter 20 is storable and a cover arrangement 27 (FIG. 1) can be used to hide it when in the storage position, which is a theft deterrent, and also provides a cleaner and more aesthetic appearance, and which has further advantages as noted below.

Figure 6:
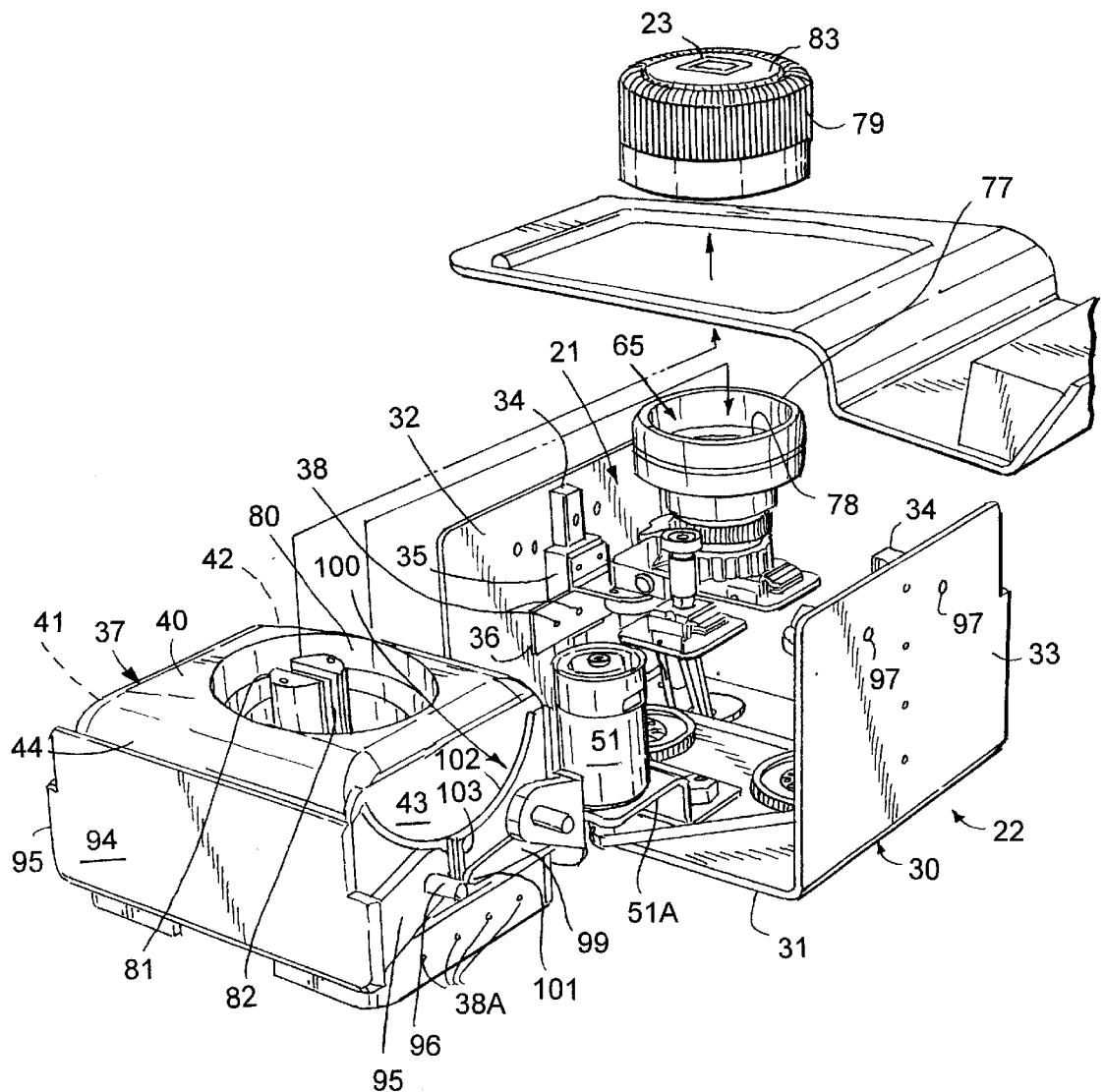
Figure 7:
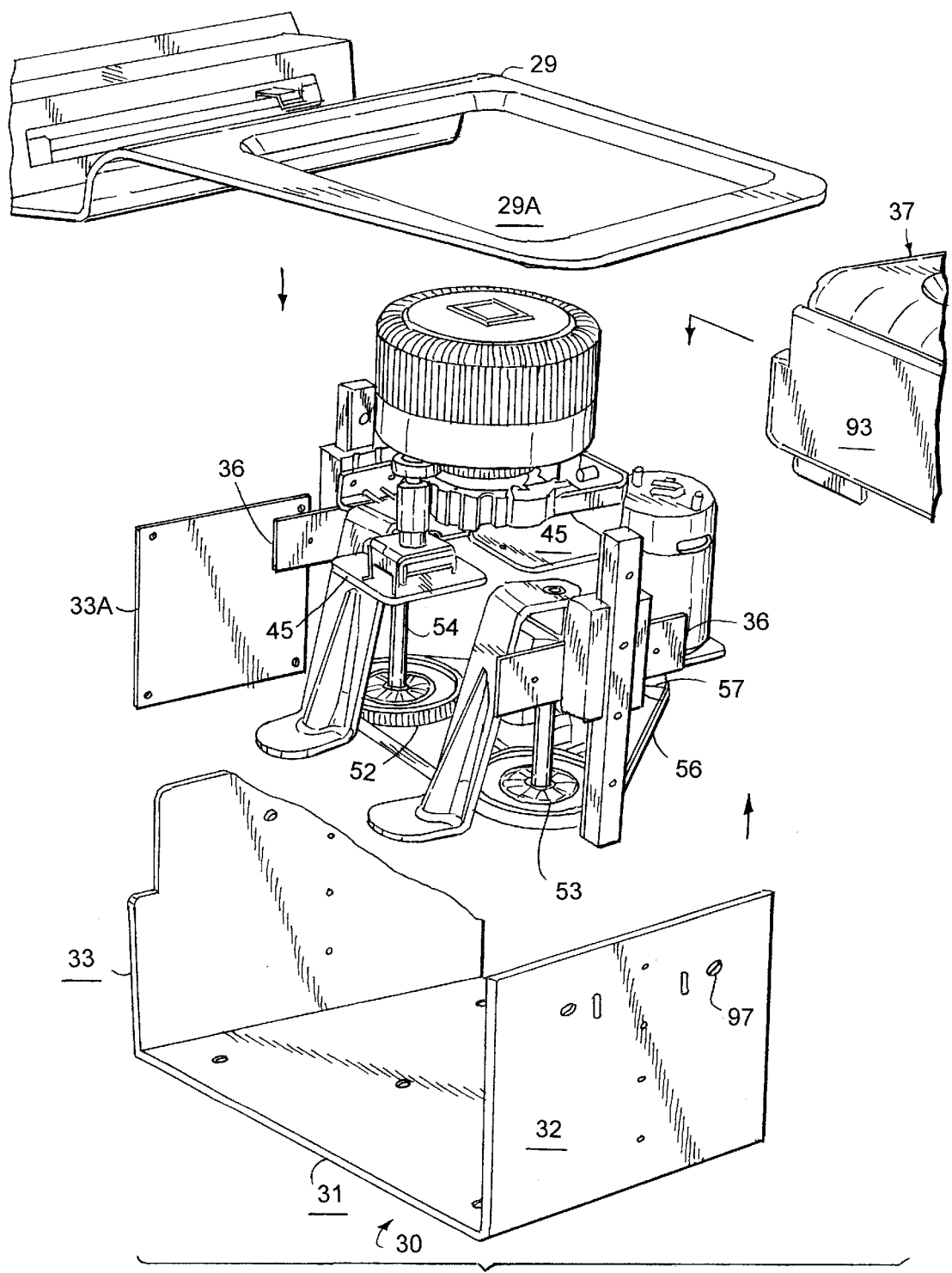
FIG. 7 is an exploded fragmentary perspective view of FIG. 5, with the internal components exploded away from the base.

The base 22 (FIG. 6) includes a U-shaped bracket 30 with a bottom panel 31 adapted for attachment to a vehicle floor pan, and side panels 32 and 33 and a sidewall stiffener 33A. An elongated stationary linear bearing 34 is fixedly attached in a vertical orientation to each of the side panels 32 and 33, and a movable bearing member 35 is slidably engaged with each linear bearing 34. A horizontally extending mounting strap 36 is attached to each movable bearing member 35, and a box-like housing or frame 37 is attached to and between the straps 36 at locations 38 on straps 36 and at locations 38A or the housing 37. The box-like housing 37 includes a top wall 40 and sidewalls 41–44, the walls 41 and 43 being attached to the straps 36 by rivets, screws, tack welds, or the like. An L-shaped bracket 46 (FIG. 8) is attached to the movable bearing member 35 and extends inwardly. A mounting flange 45 is bent inwardly from each of sidewalls 42 and 44 at a location coplanar with the horizontal inner leg 46A of the L-shaped bracket 46. The mounting flange 45 extends under and parallel the top wall 40. The mounting flanges 45 and the horizontal legs 46A provide a mounting surface for internal components of the driver interface module 21, as noted below. The inner leg 46A of the L-shaped bracket 46 carries a drive nut 47 which forms a part of the drive mechanism 50 for lifting the driver interface module 21 for use and lowering it for storage, as described below.

The drive mechanism 50 (FIG. 8) includes a reversible 12 v DC motor 51 mounted to the bracket 30 by bracket 51A (FIG. 6), drive wheels 52 and 53 (FIG. 8) rotatably supported by threaded drive shafts 54 and 55, respectively, on the bracket 30 and a drive belt 56 that engages a rotatable shaft 57 of the motor 51 and the wheels 52 and 53. A bottom end of the drive shaft 54 is supported by a bearing in the bottom panel 31 of the bracket 30, and a top end of the drive shaft 54 is supported by a bearing at a top 59 of a Z-shaped stanchion bracket 60 fixed to the bracket 30. Shaft 55 is similarly supported by the bottom panel 31 and by a second stanchion bracket 61. Drive nuts 47 threadably engage matching threads on the drive shafts 54 and 55. When the motor 51 is actuated to turn motor shaft 57, the drive belt 56 rotates wheels 52 and 53, which in turn rotate drive shafts 54 and 55. In turn, the drive nuts 47 "walk" up and down the shafts 54 and 55, carrying the housing 37 and all internal components of the driver interface module 21. Notably, the sidewalls 41–44 fit inside of the side panels 32 and 33 of bracket 30 and inside of the bearing members 34 and 35 and straps 36, but the sidewalls 41–44 (when the housing 37 is in a lowered storage position) are located outside of and surround the stanchion brackets 60 and 61 and the drive mechanism 50 including the drive shafts 54 and 55 and the motor 51. Nonetheless, it is contemplated that many different constructions for providing movement are possible and are contemplated to be within a scope of the present invention. Further, it is contemplated that the mechanism 50 can be constructed to provide infinitely adjustable use positions having different heights, and that the drive mechanism need not be limited to only vertical adjustment. It is specifically contemplated that the present device could be oriented to provide lateral or fore/aft adjustment.

Figure 11:
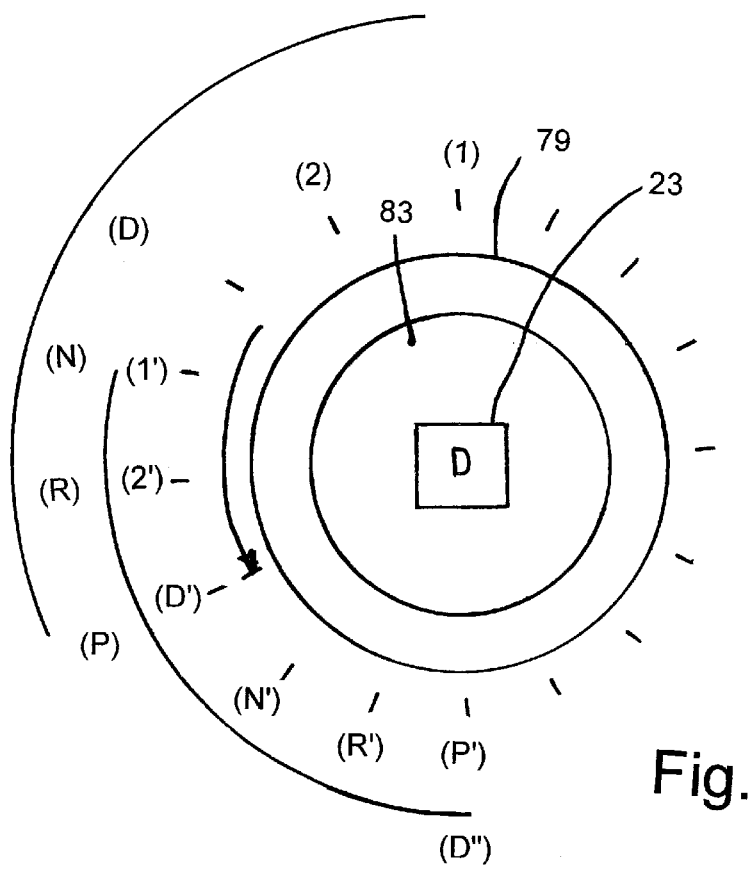
FIGS. 11 and 12 are schematic top views of the driver interface module shown in FIG. 8.
Figure 12:
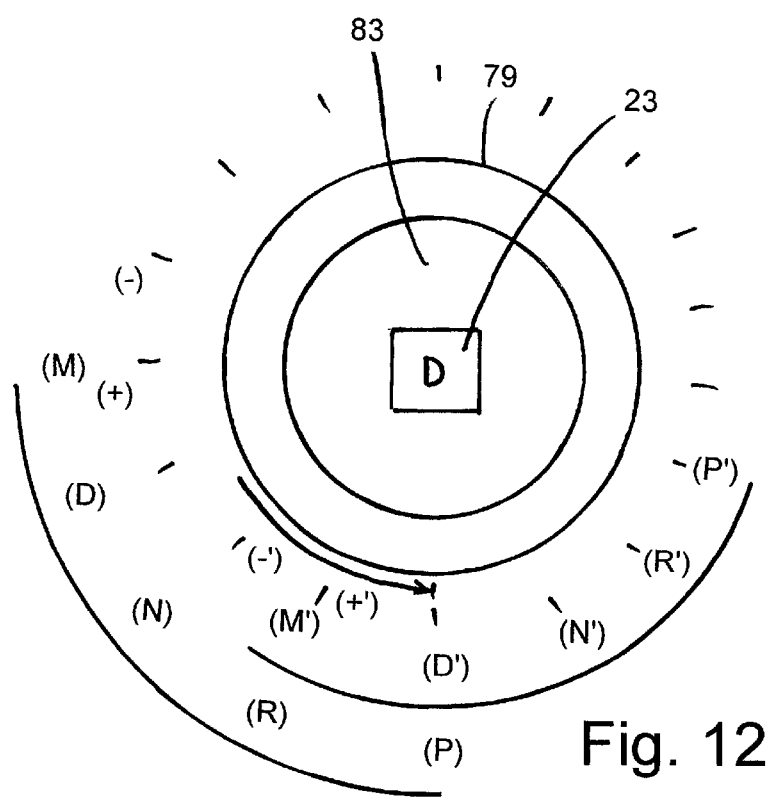

The driver interface module 21 (FIG. 8) includes internal components supported on mounting flanges 45 which extend inwardly from sidewalls 42 and 44 of the housing 37. The driver interface module 21 includes a center post member 65 that is rotatably supported on the mounting flange 45. A lower horizontal section of the post member 65 (FIG. 6) includes a ring of regularly-spaced undulations 66 that extend 360 degrees around the post member 65. The feel positioner 48 includes a cylindrical roller 67 supported for rotation against the undulations 66 by a hand 68 and a leaf-spring support 69. The leaf-spring support 69 includes an outer end attached either to an "up" flange 70 on the mounting flange 45 or to the sidewall 44 of the housing 37. The leaf-spring support 69 is resilient, and biases the roller 67 against the undulations 66 in a manner that provides a good detented feel to a vehicle driver rotating post member 65 of the driver interface module 21. Further, it holds the post member 65 in a selected position. As illustrated, the undulations 66 form about twelve to sixteen depressions around the post member 65, but of course more or less depressions can be used. As described in more detail below, it is possible for any five (or six) adjacent depressions of knob 79 to be associated with the park "P", reverse "R", neutral "N", drive "D" and a low gear drive position(s) of the shifter lever at a given time. It is contemplated that the low gear positions could be associated with specific gear positions such as first "1" or second "2" (FIG. 11) or with a manual shift position "M" where an upshift position "+" and downshift position "−" are located immediately adjacent and close to the "M" position (FIG. 12). (Alternatively, the upshift "+" and downshift "−" could be executed via a remote system, such as by paddles on a steering wheel or switches on an instrument panel or console.) In FIG. 11, the gear positions "P", "R", "N", "D", "2", and "1" indicate the shift position as the knob 79 is dialed. By way of example, if a requested shift is rejected when shifting from "D" to "P", the new relative gear positions are shown by "P'", "R'", "N'", "D'", "2'" and "1'" (FIG. 11). The same is true for the FIG. 12, except the gear positions "2" and "1" are replaced by a manual shift position "M" having an upshift position "+" and a downshift position "−". The corresponding new relative gear positions "M'", "+'", and "−'" occur if a requested shift from "D" to "P" is rejected. If a shift from "D'" to "P'" is rejected a second time, the new reset gear position would be "D''" (see FIG. 11).

Figure 5:
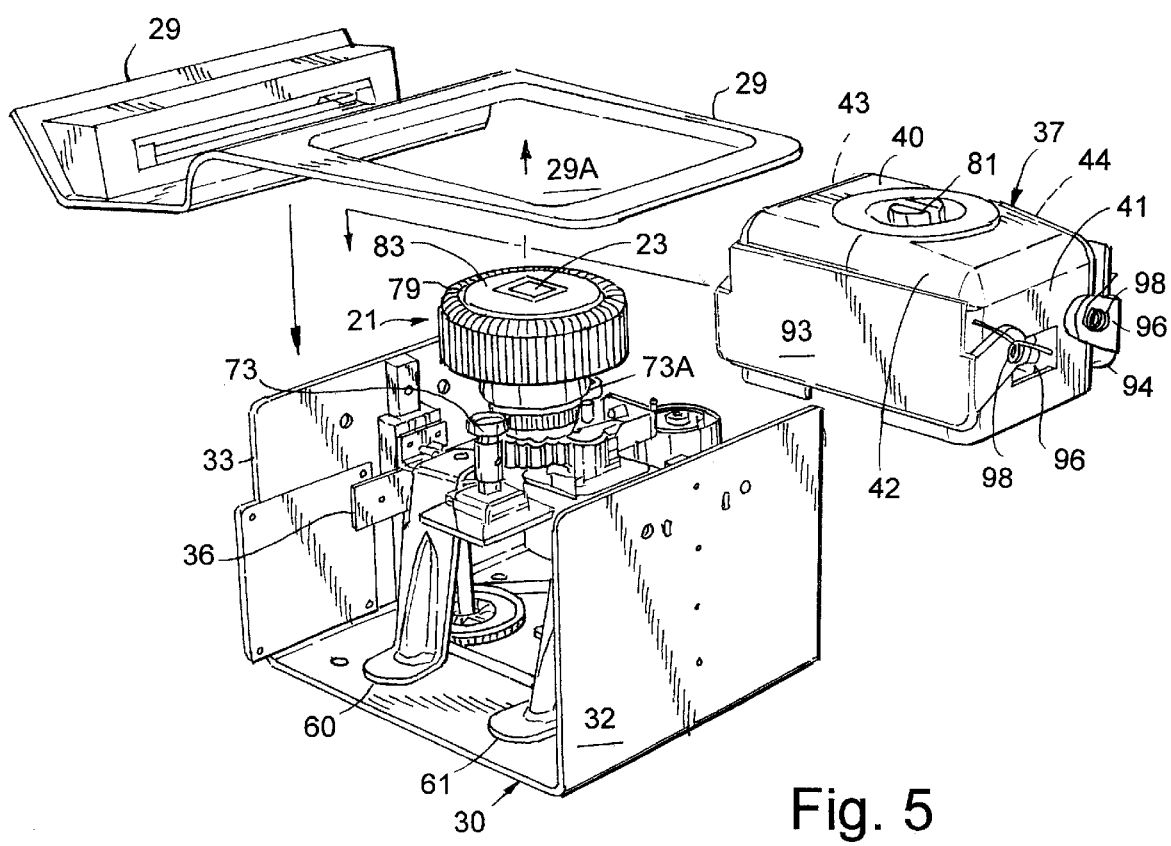
FIGS. 5–6 are exploded perspective views of the shifter shown in FIG. 4, the views being taken from opposite corners.
Figure 8:
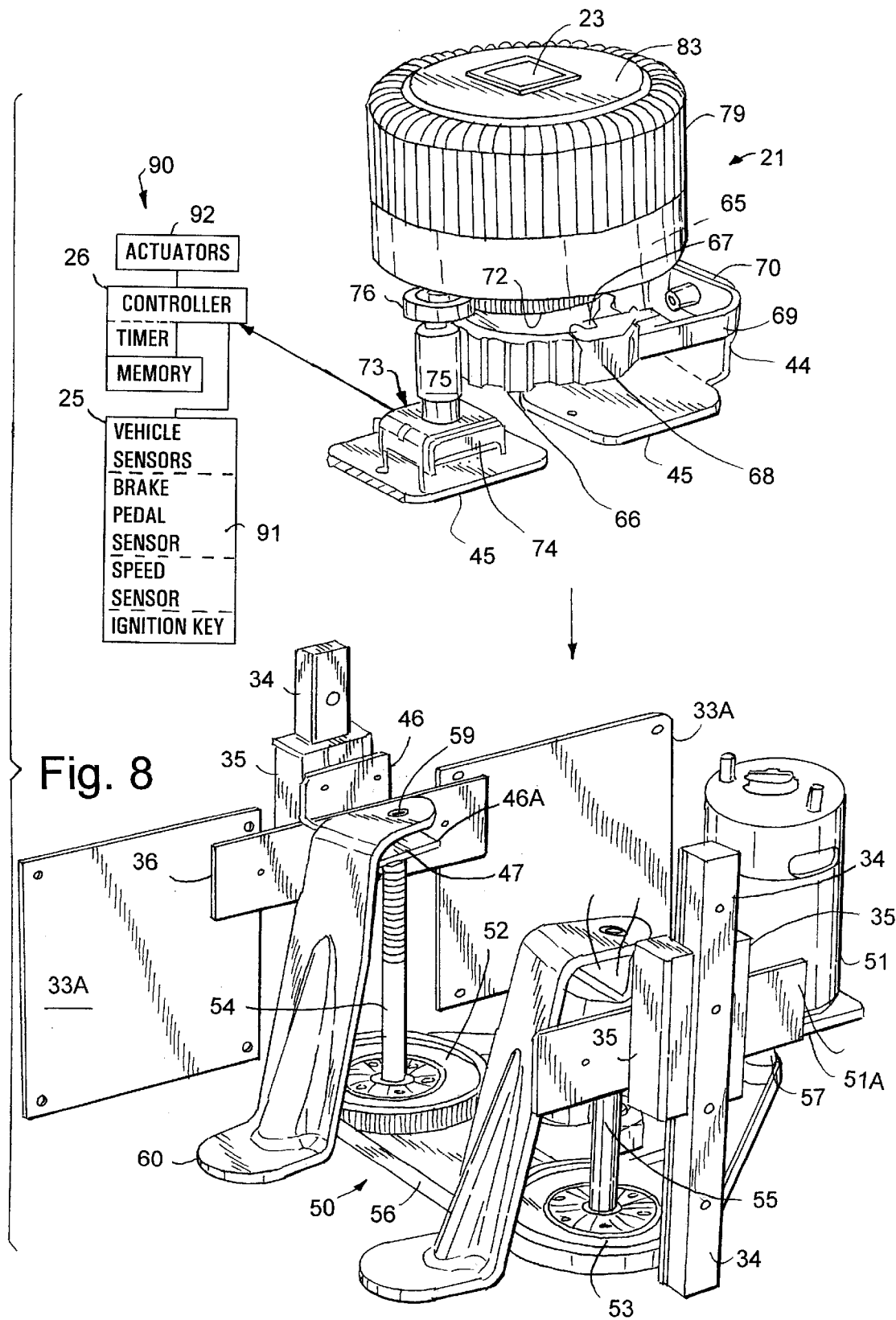
FIG. 8 is an enlarged perspective view of the internal components shown in FIG. 7.

The post member 65 further includes a second horizontal section immediately above the ring of undulations 66, which includes a circumferential row of teeth 72 (FIG. 8). An encoder 73 is attached to mounting flange 45 and includes a stationary portion 74 and a rotatable shaft 75 with a pinion gear 76 on one end engaging the teeth 72. The shaft 75 of the encoder 73 is rotated as the post member 65 is rotated by a vehicle driver, such that the encoder 73 generates an output to the controller 26 indicating relative rotation of the post member 65. A second encoder 73A (FIG. 5) similar to encoder 73 is optionally mounted on mounting flange 45 opposite the encoder. By this arrangement, one or both of the encoders 73 and 73A output a signal corresponding to a relative position change of the post member 65. It is noted that the encoders 73 and 73A could be replaced with other sensory devices, such as switches or potentiometers.

Figure 9:
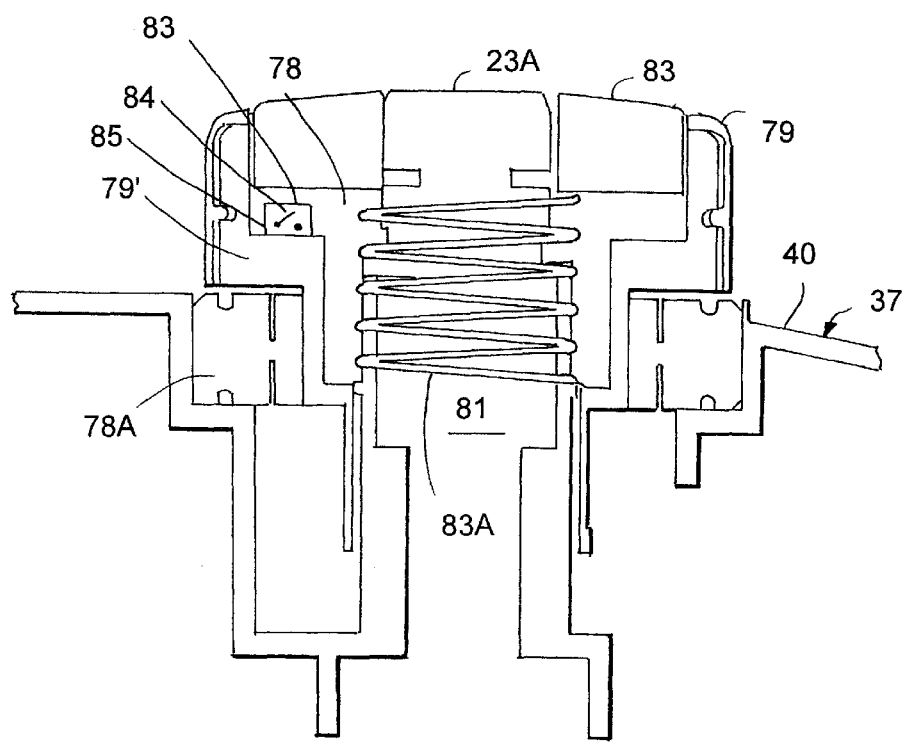
FIG. 9 is a cross section taken along line IX—IX in FIG. 6.
Figure 10:
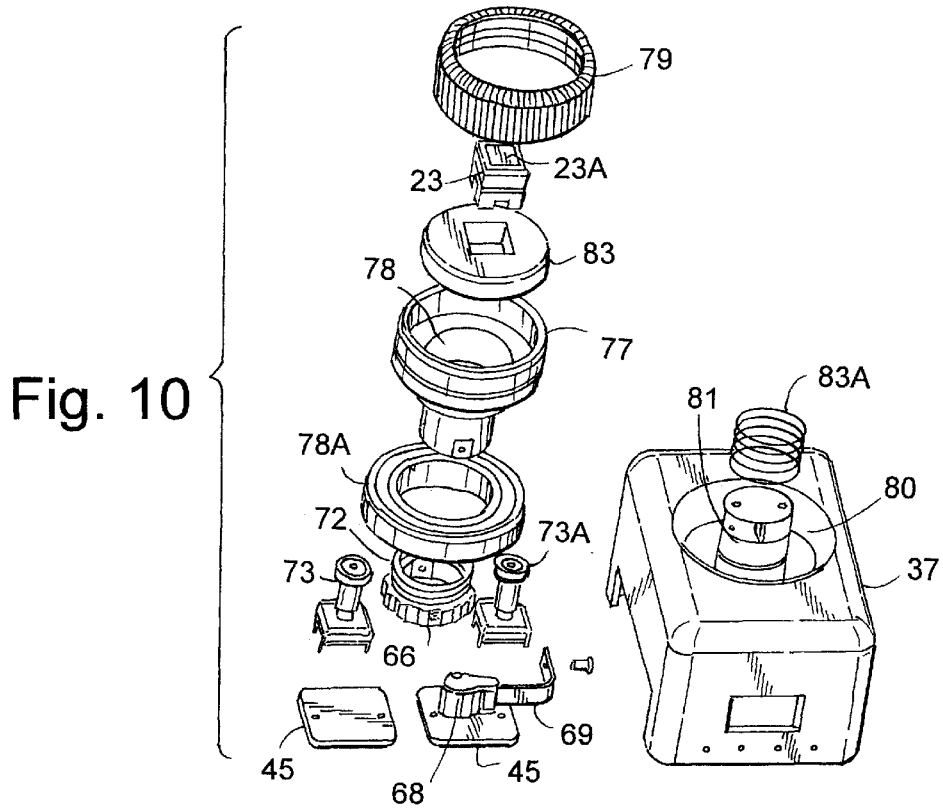
FIG. 10 is an exploded perspective view of the driver interface module shown in FIG. 8.

A top section of the post member 65 (FIG. 6) includes an enlarged ring 77 with a recess 78 therein. A bearing 78A is located in the recess 78. The ring 77 includes an outer surface that, along with bearing 78A, rotatably supports a knob or dialable handle 79. The top wall 40 of the housing 37 includes a recess 80 shaped to receive and support the knob 79 for rotation. A center stud 81 (with slot 82 for receiving a ribbon cable for the display 23 routed through stud 81) extends upwardly from the mounting flange 45 through the recess 80 and into a center portion of the knob 79. The display 23 engages a top of the center stud 81 to prevent the display 23 from rotating as the knob 79 is rotated. A depressible carrier 83 is supported in a center of the knob 79 on spring 83A. The illustrated display 23 is an LED display having a window 23A for showing the indicia, but it is contemplated that the display can be virtually any type of electrical display capable of providing indicia such as "P", "R", "N" or "D" to indicate a position of the driver interface module 21. Further, the display can be located outside the knob 79, such as along the bezel cover 29, in the vehicle's instrument panel, or in a heads-up display in the vehicle. The illustrated carrier 83 is spring-biased toward a raised position by spring 83A. By depressing the carrier 83 against the lower portion 79A of knob 79, one or both of the enabling switches 84 including contacts 85 and 86 positioned under the knob 79 is actuated (FIG. 9) to provide an enabling function as described below.

An electrical circuit 90 (FIG. 8) is provided for power train control for the vehicle. The electrical circuit 90 includes the controller 26, which can be a computer chip, microprocessor, or other device for receiving data outputs from different sensors. The circuit 90 further includes various vehicle sensors, such as a switch 91 for sensing a brake pedal position, the driver interface module 21, and numerous other vehicle sensors such as for providing throttle pedal position, clutch pedal position, vehicle speed, engine and transmission conditions and parameters, etc. The circuit 90 still further includes vehicle control devices, such as actuators 92 for shifting a transmission, for controlling engine fuel flow, engine air flow, and the like. Such sensors and actuators are well known in the art and need not be described in detail herein for an understanding of the present invention by a person skilled in the art of vehicle shifters and vehicle drive train control (i.e. control of engine and transmission speeds, shifting, and the like). It is contemplated that the circuit 90 will automatically shift the transmission to the park position "P" when the driver interface module 21 is in the stored recessed position (FIG. 1).

Figure 2:
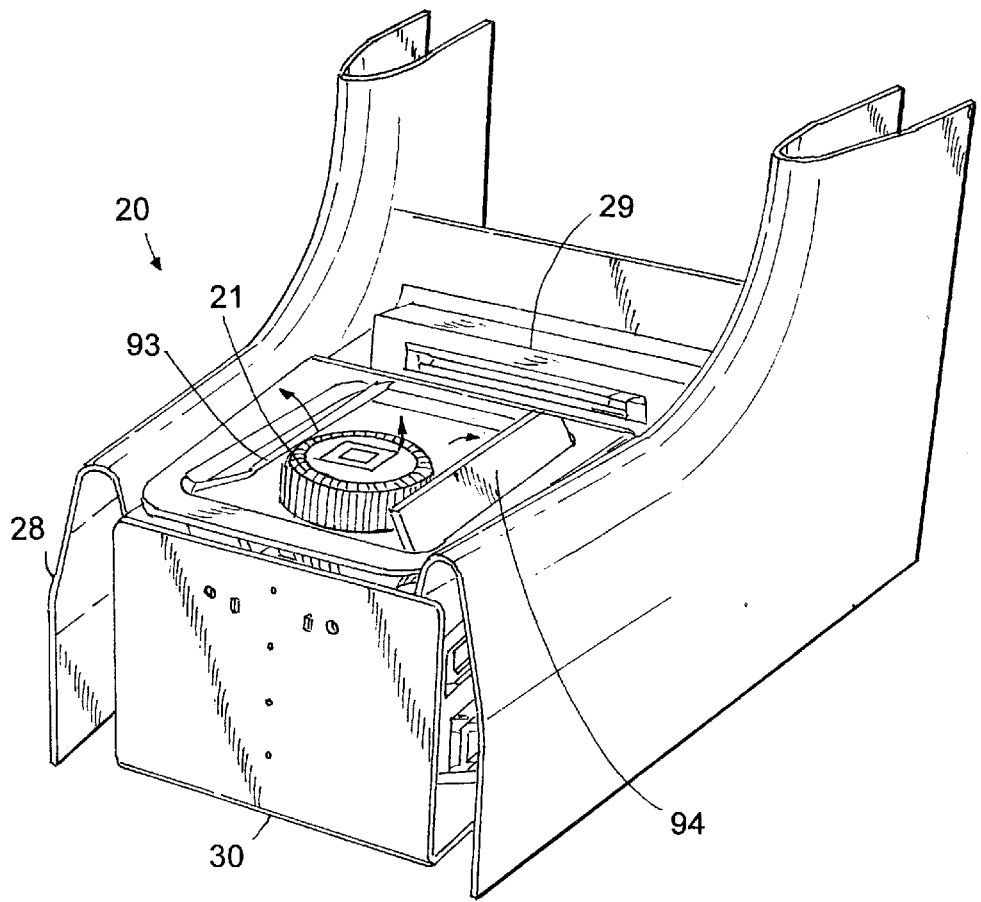
FIGS. 2–3 are perspective views similar to FIG. 1, but showing the shifter in a partially raised position and a fully raised use position, respectively.

A pair of identical covers 93 and 94 (FIG. 6) are pivotally attached to the side panels 32 and 33 of the U-shaped bracket 30 for movement between a covering position (FIG. 1) where the covers 93 and 94 shield the driver interface module 21, and an open position (FIG. 3) where the covers 93 and 94 are located parallel the side panels 32 and 33 and where the driver interface module 21 is raised/exposed for use. Specifically, the cover 94 (and also cover 93) includes a top panel with a pair of cover-supporting arms 95 that extend parallel side panels 32 and 33. The arms 95 each include outwardly-extending opposing pivot protrusion(s) 96 pivoted to holes 97 in the side panels 32 and 33. One or more springs 98 (FIG. 5) are attached around the protrusion(s) 96 to bias the covers 93 and 94 toward their closed module-covering position. Cover-actuating arms 99 are attached to at least one of the cover-supporting arms 95 on each of the covers 93 and 94, and a groove 100 is provided on the outside surface of the sidewall 43 for engagement by a follower protrusion 101 on each of the cover-actuating arms 99. The grooves 100 each include a curved section 102 for opening the covers 93 and 94 quickly as the driver interface module 21 is initially moved from the stored position (see FIG. 1) toward the partially opened position (see FIG. 2). Thereafter, the grooves 100 include a straight section 103 that hold the covers 93 and 94 fully open as the driver interface module 21 is further moved to its fully raised position for use (FIG. 30).

In the present construction, the driver interface module 21 is initially recessed and covered and visually shielded by the covers 93 and 94 in a theft-resistant arrangement. Upon placing a key in the ignition and turning the key to the ignition "on" position, the controller 26 actuates the motor 51 causing the housing 37 to rise vertically along with the driver interface module 21. As the housing 37 initially moves upward, the covers 93 and 94 pivot apart and into a storage position adjacent the side panels 32 and 33 of the mounting bracket 30. The housing 37 and the driver interface module 21 continue to move upward to their final raised position, where the knob 79 and display 23 are visible and easily accessible.

After the vehicle engine is started and the driver is ready to go, the driver rotates the knob 79 to a selected gear position and then depresses carrier 83, causing the controller 26 (FIG. 8) to the display 23 to change from the park indicia "P" to a selected gear, such as drive gear "D". The selected gear is confirmed when switch 84 is closed. The encoder 73 (and/or encoder 73A) generates a shift-change-request output signal as the knob 79 is rotated that is communicated to the controller 26. The controller 26 also receives signals from the vehicle sensors, such as the brake sensor 91 that indicates that the brake pedal is depressed, and after confirming that predetermined operating conditions are met, the controller 26 generates a shift signal to the transmission actuators for shifting the transmission from the park gear position to the selected gear position. Once the vehicle driver decides to shift from the selected gear to another gear, the process is repeated. If the carrier 83 is not depressed, then the shift will not occur and the gear positions of knob 79 will reset to the new relative positions. (See FIGS. 11–12, for example). The display 23 will reset to the actual gear position as well. For example, where a driver moves the knob 79 from its drive position "D" to a park position "P", but the shift is rejected, the controller 26 resets the display 23 and the relative gear position of the knob 79. Specifically, the relative gear positions of the knob 79 resets to the new gear positions shown in FIG. 11 as "P'", "R'", "N'", "D'", "2'", and "1'". If this occurs a second time, yet a different new park position will be set. It is noted that the present invention is also usable in shifters having a manual shift position "M" where a forced upshift "+" or downshift "−" are possible (see FIG. 12).

The present controller 26 is programmed as follows to handle one possible sequence that may occur when the vehicle is speeding down a highway at 50 miles per hour toward a stop sign. If the driver rotates the knob 79 from the drive position "D" to the park position "P" and depresses the carrier 83 to confirm, the controller 26 senses from a vehicle sensor that the vehicle speed is too fast to allow this shift to safely occur. In this circumstance, the controller 26 refers to a lookup table relating safe shifts to vehicle speed in its memory and as a result, does not generate a signal to cause a shift. Further, the present controller 26 causes the indicia to change from the requested gear position "P" back to the presently selected gear position "D" (since the transmission is still in the drive gear position). It is noted that the knob 79 is rotated to a new position, and stays in that new position, even though the transmission gear has not changed. The indicia on display 23 initially changes from "D" to "P" so that the driver knows that he (or she) has selected the gear that he (or she) wants. Thereafter, when the shift request is rejected, the display changes back to "D". Alternatively, a timer can be used on the controller 26 that times out (such as after two or three seconds) before the controller 26 returns or "resets" the display 23 back to show the indicia of the actual gear position of the transmission. It is contemplated that the controller 26 can also be programmed to give feedback to a vehicle driver when a shift request is rejected (or accepted), such as by activating a chime or a loud "clicking" noisemaker. It is also contemplated that the system can be programmed to cause the relative positions "P", "R", "N", "D", "2", and "1" to be in locations that are a mirror image of FIG. 11, which may be desired for European cars (vs. American cars).

It is to be understood that when the driver interface module 21 is in a given position, the undulations ahead and behind that position form a set of undulations cause "clicks" and that bias the knob 79 to a centered position on a selected one of the gear positions. For example, when the driver interface module 21 is in a particular position and the transmission is in the reverse position "R", one "click" of the knob 79 counterclockwise will be a request to shift into park "P", and one click of the knob 79 clockwise will be a request to shift into neutral "N" and two clicks of the knob 79 clockwise will be a request to shift into drive "D". When the driver interface module 21 is rotated one click in a clockwise direction and the controller 26 confirms that predetermined vehicle conditions are met and shifts the transmission, the undulations that correspond to the "P", "R", "N", and "D" gear positions stay the same. Also, in the manual shift position "M", a slight movement clockwise causes an upshift "+" with a bias back toward the centered position "M", and a slight movement counter-clockwise causes a downshift "–" with a bias back to the centered position "M". It is also noted that the controller 26 can be specifically programmed for the circumstances where the knob 79 is rotated beyond the "set" of undulations that correspond to a gear position. For example, if the knob 79 is rotated about 180 degrees, the controller 26 may be programmed to not make any gear change, or alternatively may be programmed to change to an appropriate gear (such as park).

It is contemplated that the knob 79 and controller 26 can be programmed so that the center carrier 83 must be depressed to close the contacts 85 and 86 of the switch 84 after the knob 79 is rotated to select (i.e. request) a gear change. This provides an enabling function that prevents an unwanted gear shift upon accidental operation of the knob 79. This is consistent with current design and safety norms that require two separate movements in order to shift between some gears. For example, in prior art shifters, in order to shift out of park, a driver must depress a pawl to move it out of a park notch, and then move the shift lever out of park position to a new position. In the present shifter arrangement, the knob 79 is rotated and then the enabling carrier 83 is depressed to effect the selected gear change. It is also contemplated that the shift control system be programmed to allow certain shifts without depressing the center portion, but immediately upon rotation of knob 79, assuming all vehicle conditions are met. For example, between gear positions N and D, there is no need to require that the button be depressed.

Figure 13:
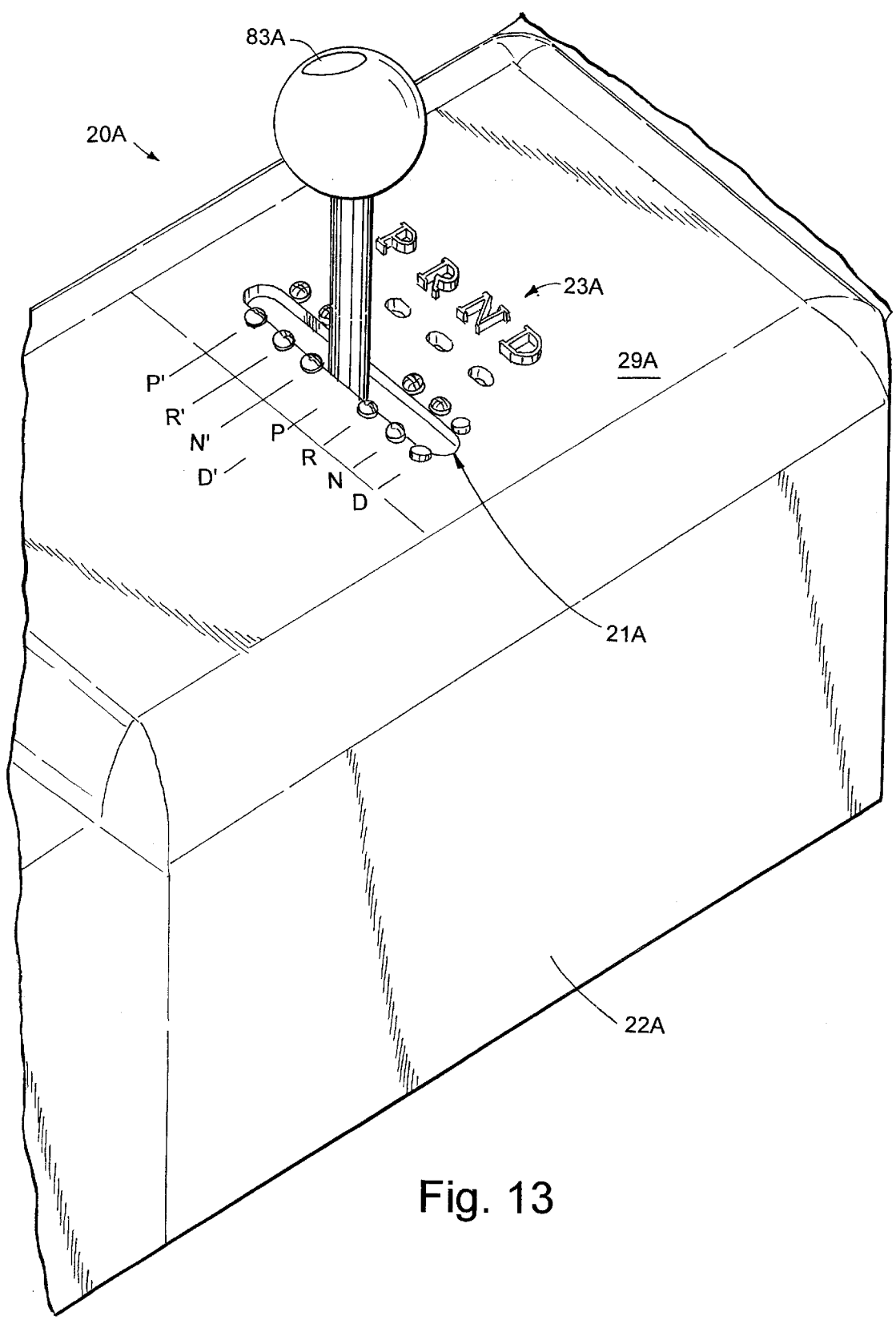
FIG. 13 is a perspective view of a modified shifter having a lever pivotable laterally and having a display, sensor, and controller for sensing relative position of the shift lever.

It is contemplated that the present invention of a driver-interface module that senses relative position (and that is programmed to reset upon rejection of a requested gear change) is usable for many different shifter designs, and not just a dialable/rotatable knob. For example, it can be adapted for use on any shifter movable through a continuous loop, or on any shifter where sensing of a relative position (instead of an absolute position) would be advantageous. FIG. 13 shows a modified shifter 20A having a driver interface module 21A in the form of a laterally-pivotable shift lever operably mounted on a base 22A, which is a between-seat floor console. (It is contemplated that the shift lever could be movable in a fore-aft direction, or diagonally.) The display 23A is mounted on cover/bezel 29A. The shift lever is shown in a centered position. If the controller has the transmission in the park "P" position, then shift lever relative positions P, R, N, and D apply. If the controller has the transmission in the drive position, then the shift lever relative positions P', R', N', and D' apply. The shift lever can be moved to any relative position and button. 83A depressed to cause a shift. The lever is spring biased to return to its centered at-rest position. The display 23A is programmed to always show the actual gear position (either instantly, or after a timed period, or after the button 83A is depressed).

In the foregoing description, persons skilled in the art will recognize that modifications may be made to the invention without departing from the concepts disclosed herein. For example, it is contemplated that several of the aforementioned concepts can be used on a traditional floor-mounted shifter with shift lever, instead of only on the illustrated dialable knob. Such modifications are to be considered as included in the following claims, unless these claims by their language expressly state otherwise.

The invention claimed is:

1. A shifter apparatus for shifting a transmission having a plurality of gear positions, comprising:

a base;

a driver interface module attached to the base and movable from a first position to a second position to indicate a desire to shift the transmission from a presently selected one of the gear positions to a new one of the gear positions;

a display capable of generating indicia corresponding to the plurality of gear positions of the transmission, the indicia including first indicia showing the presently selected one gear position and a second indicia corresponding to the new one gear position;

at least one sensor adapted to sense predetermined vehicle conditions; and a controller operably coupled to the driver interface module, the display, and the sensor and programmed to, when the driver interface module indicates a shift change and the at least one sensor indicates the predetermined vehicle conditions are met, generate a transmission-controlling output signal adapted to shift the transmission to the new one gear position and further to change the display from the first indicia to the second indicia;

the controller being further programmed, when the driver interface module indicates a shift change but the at least one sensor does not indicate that the predetermined vehicle conditions are met, to not shift the transmission and instead to cause the display to show the first indicia until a new shift request signal is received from the driver interface module and further being programmed to reset after a predetermined period of time so that, within the controller, the second position of the driver interface module becomes a new primary position for use when generating future transmission-controlling output signals.

2. The shifter apparatus defined in claim 1, wherein the driver interface module includes a dialable handle movable between the first and second positions to indicate a shift request.

3. The shifter apparatus defined in claim 2, wherein the dialable handle is continuously rotatable through greater than 360 degrees.

4. The shifter apparatus defined in claim 1, wherein the driver interface module includes a member movable through a complete loop forming a continuous looped path.

5. A shifter apparatus for shifting a transmission having a plurality of gear positions, comprising:
   a base;
   a driver interface module attached to the base and movable from a first position to a second position to indicate a desire to shift the transmission from a presently selected one of the gear positions to a new one of the gear positions;
   a display capable of generating indicia corresponding to the plurality of gear positions of the transmission, the indicia including first indicia showing the presently selected one gear position and a second indicia corresponding to the new one gear position;
   at least one sensor adapted to sense predetermined vehicle conditions; and
   a controller operably coupled to the driver interface module, the display, and the sensor and programmed to, when the driver interface module indicates a shift change and the at least one sensor indicates the predetermined vehicle conditions are met, generate a transmission-controlling output signal adapted to shift the transmission to the new one gear position and further to change the display from the first indicia to the second indicia;
   the controller being further programmed, when the driver interface module indicates a shift change but the at least one sensor does not indicate that the predetermined vehicle conditions are met, to not shift the transmission and instead to cause the display to show the first indicia until a new shift request signal is received from the driver interface module, and
   the driver interface module being movably attached to the base, and the base including a recess for moving the driver interface module between a storage position within the recess and a use position at least partially outside of the recess.

6. The shifter apparatus defined in claim 5, including covers adapted to cover the recess and shield the driver interface module when in the storage position.

7. The shifter apparatus defined in claim 6, including a floor-mounted console, the base being positioned within the console.

8. The shifter apparatus defined in claim 1, wherein the display is positioned on the driver interface module.

9. The shifter apparatus defined in claim 1, wherein the driver interface module includes a button operably connected to the controller and that must be depressed to select the new one gear position.

10. The shifter apparatus defined in claim 1, wherein the driver interface module includes a lever.

11. A shifter apparatus for shifting a transmission having a plurality of gear positions, comprising:
    a base;
    a driver interface module attached to the base and movable from a first position to a second position in a two-step sequence to indicate a desire to shift the transmission from a presently selected one of the gear positions to a new one of the gear positions;
    a display capable of generating indicia corresponding to the plurality of gear positions of the transmission, the indicia including a first indicia showing the presently selected one gear position and a second indicia corresponding to the new one gear position;
    at least one sensor adapted to sense predetermined vehicle conditions; and
    a controller operably coupled to the driver interface module, the display and the sensor and programmed to, when the driver interface module indicates a shift change via the two-step sequence and the at least one sensor indicates the predetermined vehicle conditions are met, generate a transmission-controlling output signal adapted to shift the transmission to the new one gear position and further to change the display from the first indicia to the second indicia;
    the controller being further programmed, when the driver interface module indicates a shift change but the at least one sensor does not indicate that the predetermined vehicle conditions are met, to not shift the transmission until a new driver-interface signal is received, the controller including a timer and being programmed to initially change the display to show the second indicia upon receiving an indication for the shift change from the driver interface module, but being programmed to reset the display to show the first indicia if the timer times out before the at least one sensor indicates that the predetermined vehicle conditions are met, and being programmed to reset the controller so that within the controller, the second position becomes reset to become analogous to the first position for the purpose of indicating a future shift change, with the future shift change being based on relative movement of the driver interface module from the second position.

12. The shifter apparatus defined in claim 11, wherein the driver interface module includes a dialable handle movable between the first and second positions to indicate a shift request.

13. The shifter apparatus defined in claim 12, wherein the dialable handle is rotatable through at least 360 degrees.

14. The shifter apparatus defined in claim 11, wherein the driver interface module includes a knob rotatable through a complete loop forming a continuous looped path.

15. A shifter apparatus for shifting a transmission having a plurality of gear positions, comprising:
    a base;
    a driver interface module attached to the base and movable from a first position to a second position to indicate a desire to shift the transmission from a presently selected one of the gear positions to a new one of the gear positions;
    a display capable of generating indicia corresponding to the plurality of gear positions of the transmission, the indicia including a first indicia showing the presently selected one gear position and a second indicia corresponding to the new one gear position;
    at least one sensor adapted to sense predetermined vehicle conditions; and
    a controller operably coupled to the driver interface module, the display and the sensor and programmed to, when the driver interface module indicates a shift change and the at least one sensor indicates the predetermined vehicle conditions are met, generate a transmission-controlling output signal adapted to shift the transmission to the new one gear position and further to change the display from the first indicia to the second indicia;

the controller being further programmed, when the driver interface module indicates a shift change but the at least one sensor does not indicate that the predetermined vehicle conditions are met, to not shift the transmission until a new driver-interface signal is received, the controller including a timer and being programmed to initially change the display to show the second indicia upon receiving an indication for the shift change from the driver interface module, but being programmed to reset the display to show the first indicia if the timer times out before the at least one sensor indicates that the predetermined vehicle conditions are met; and the driver interface module being movably attached to the base and the base including a recess for moving the driver interface module between a storage position within the recess and a use position at least partially outside of the recess.

16. The shifter apparatus defined in claim 15, including covers adapted to cover the recess and shield the driver interface module when in the storage position.

17. The shifter apparatus defined in claim 11, wherein the display is positioned on the driver interface module.

18. The shifter apparatus defined in claim 11, including a floor-mounted console, the base being positioned within the console.

19. The shifter apparatus defined in claim 11, wherein the driver interface module includes a button operably connected to the controller and that must be depressed to select the new one gear position.

20. An apparatus adapted for connection to vehicle sensors and further adapted for connection to a driver interface module, for shifting a transmission having a plurality of gear positions, and still further adapted for connection to a display for indicating selected gear positions, comprising:

a controller programmed to, when a shift-change-request signal is received from the driver interface module and when a vehicle-conditions-met signal is received from the vehicle sensor indicating that the predetermined vehicle conditions are met, generate a transmission-controlling output signal adapted to shift the transmission to a new one gear position and further adapted to generate a display-controlling output signal adapted to change the display from a first indicia to a second indicia;

the controller being further programmed, when the shift-change-request signal is received from the driver interface module but the vehicle-conditions-met signal is not received from the sensor, to not shift the transmission and instead to cause the display to show the first indicia until a new shift-change-request signal is received, and further being programmed to reset the controller so that any new shift-change-request signal is generated based on relative movement from a most recent relative position of the driver interface module and not from an original position of the driver interface module.

21. An apparatus for shifting a vehicle transmission having a plurality of gear positions, comprising:

a driver interface module configured to move between a plurality of discrete positions defining a continuous looped path and to generate a shift-change-request signal based on the movement to each of the discrete positions, the discrete positions corresponding to the gear positions and being at different locations along the continuous looped path; and an electrical control circuit including a controller operably connected to the driver interface module for receiving the shift-change-request signal, the controller being programmed to shift the vehicle transmission based on a relative change in position of the driver interface module as the driver interface module is moved between the discrete positions, the controller characteristically being programmed so that the plurality of discrete positions correspond to the plurality of gear positions at any point in time but so that the plurality of discrete positions will index and correspond in a new manner to the plurality of gear positions if the shift request signal is rejected by the controller.

22. The shifter apparatus defined in claim 21, wherein the driver interface module includes a dialable handle movable between first and second positions to indicate a shift request.

23. The shifter apparatus defined in claim 22, wherein the dialable handle is rotatable through at least 360 degrees.

24. The shifter apparatus defined in claim 21, wherein the driver interface module includes a knob rotatable through a complete loop forming the continuous looped path.

25. An apparatus for shifting a vehicle transmission having a plurality of gear positions, comprising:

a driver interface module configured to move between a plurality of discrete positions and to generate a shift-change-request signal based on the movement; and a controller operably connected to the driver interface module for receiving the shift-change-request signal, the controller being programmed to shift the vehicle transmission based on a relative change in position of the driver interface module as the driver interface module is moved between the discrete positions, the controller characteristically being programmed so that the plurality of discrete positions correspond to the plurality of gear positions at any point in time but so that the plurality of discrete positions will index and correspond in a new manner to the plurality of gear positions if the shift request signal is rejected by the controller; and a base, the driver interface module being movably attached to the base and the base including a recess for moving the driver interface module between a storage position within the recess and a use position at least partially outside of the recess.

26. The shifter apparatus defined in claim 25, including covers adapted to cover the recess and shield the driver interface module when in the storage position.

27. The shifter apparatus defined in claim 25, including a display is positioned on the driver interface module.

28. The shifter apparatus defined in claim 25, including a floor-mounted console, the base being positioned within the console for supporting the driver interface module in the console.

29. A shifter apparatus for shifting a transmission for a vehicle comprising:

a base defining a cavity; and a driver interface module configured and adapted to shift a vehicle transmission, the driver interface module being movably mounted to the base for linear movement between a use position located at least partially outside the cavity and a stored position in the cavity.

30. The shifter apparatus defined in claim 29, wherein the base includes linear bearings supporting the driver interface module for linear vertical movement on the base.

31. A shifter apparatus for shifting a transmission for a vehicle comprising:
   a base;
   a driver interface module operably mounted to the base; and
   a cover movable between an open position for permitting driver access to the driver interface module and a shielding position for covering the driver interface module.

32. An apparatus for shifting a vehicle transmission having a plurality of gear positions, comprising:
   a driver interface module defining a plurality of discrete positions and including a shifter position sensor configured to output a shift change request signal when the driver interface module is moved between the discrete positions; and
   a controller operably connected to the shifter position sensor for receiving the shift change request signal, the controller being programmed to shift the vehicle transmission based on a relative change in position of the driver interface module as the module is moved between the discrete positions when predetermined vehicle conditions are met, but being programmed to not shift the transmission when predetermined vehicle conditions are not met, even though the driver interface module remains in a newly selected one of the discrete positions after the shift change request signal is generated, the controller characteristically controlling the transmission based on relative movement of the driver interface module and not based on an absolute location of the driver interface module.

33. The apparatus defined in claim 32, wherein the driver interface module includes a dialable knob rotatable at least 360 degrees.

34. An apparatus for shifting a vehicle transmission having a plurality of gear positions, comprising:
   a driver interface module including a dialable knob rotatable at least 360 degrees to a selected dialed position to select one of the plurality of gear positions, a display for indicating the selected dialed position, and a depressible button located on the driver interface module that is depressible for confirming the selection of the one gear position, a circuit having a timer that times out and resets the driver interface module to correspond to a previously selected gear position unless the button is depressed within a predetermined time period after the knob is rotated.

35. The apparatus defined in claim 34, wherein the dialable knob is rotatable beyond 360 degrees.

36. A shifter apparatus for shifting a transmission having a plurality of gear positions, comprising:
   a base;
   a driver interface module including a shift member movably mounted on the base for relative movement between a plurality of positions;
   a sensor device adapted to generate a signal representing a shift change request based on a relative movement of the shift member from an original position to a changed position;
   a controller operably connected to the sensor and programmed to determine whether predetermined vehicle operating conditions are met and, if met, being programmed to shift the transmission to a selected one of the gear positions based on the relative movement, and if not met, being programmed to reject the shift change request;
   the controller, in preparation for the next shift change request, being programmed to reset so that the changed position becomes recognized by the controller as a newly reset home position even though the shift change request is rejected and even though the shift member remains in a newly-selected one of the plurality of positions.

37. The shifter apparatus defined in claim 36, wherein the driver interface module is configured to move along an endless continuous loop.

38. The shifter apparatus defined in claim 37, wherein the continuous loop includes 360 degrees rotation of the shift member.

39. The shifter apparatus defined in claim 36, wherein the shift member includes a dial. rotatable at least about 360 degrees.

40. The shifter apparatus defined in claim 39, wherein the shift member is rotatable and depressible and is movable along a two-step shift sequence to prevent accidental actuation of the shift member, the two-step shift sequence including depressing the dial and rotating the dial.

41. The shifter apparatus defined in claim 36, wherein the driver interface module is movably mounted to the base and movable between a storage position and a use position.

42. The shifter apparatus defined in claim 36, wherein the driver interface module includes a cover adapted to cover the driver interface module on the base and prevent access to the driver interface module when the cover is in a securing position.

43. A shifter for shifting a vehicle transmission having a plurality of gear positions, comprising:
   a shifter base defining a home position and a plurality of discrete positions, an upright shift lever shiftable between the home position and the plurality of discrete positions, and at least one shifter position sensor configured to output a shift change request signal when the shift lever is moved from the home position to one of the discrete positions; and
   a controller operably connected to the shifter position sensor for receiving the shift change request signal, the controller being programmed to shift the vehicle transmission based on a relative change in position of the shift lever as the shift lever is moved from the home position to a selected one of the discrete positions when predetermined vehicle conditions are met, but being programmed to not shift the transmission when predetermined vehicle conditions are not met, the shift lever being biased to return to the home position, the controller characteristically controlling the transmission based on relative movement of the shift lever from the home position to the selected one discrete position and not shifting the transmission based on an absolute location of the driver interface module, the controller being programmed to reset the home position to correspond to an actual gear position of the transmission and to activate a display showing the actual gear position of the transmission.

44. The apparatus define in claim 43, wherein the shift lever includes an upright post, and a handle with a depressible button.

* * * * *